Nov. 27, 1951  W. R. JOST ET AL  2,576,794
DEMOUNTABLE TRAY SIEVE
Filed July 19, 1948  3 Sheets-Sheet 2
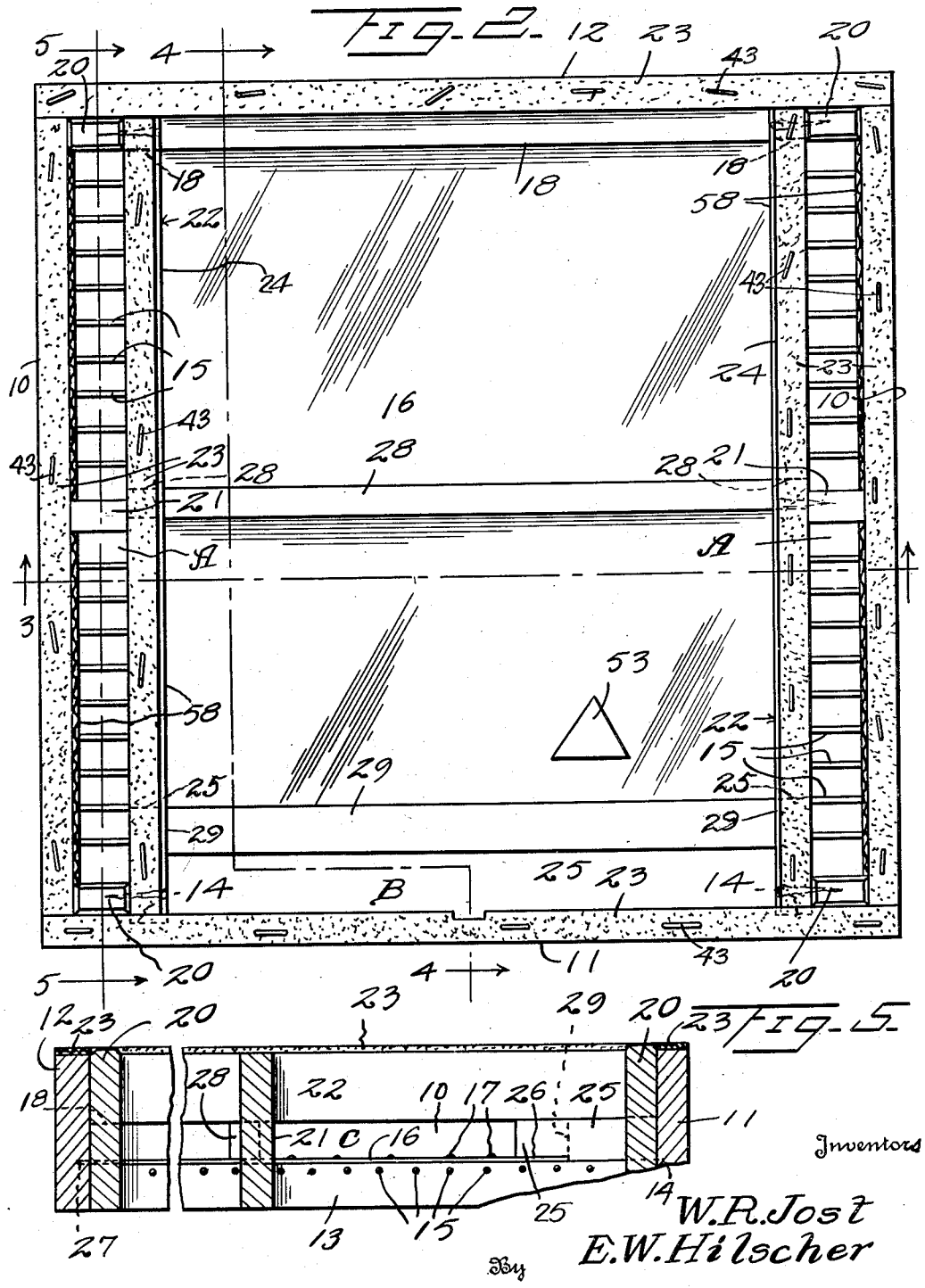
Inventors
W. R. Jost
E. W. Hilscher
By
Kimmel & Crowell Attys.

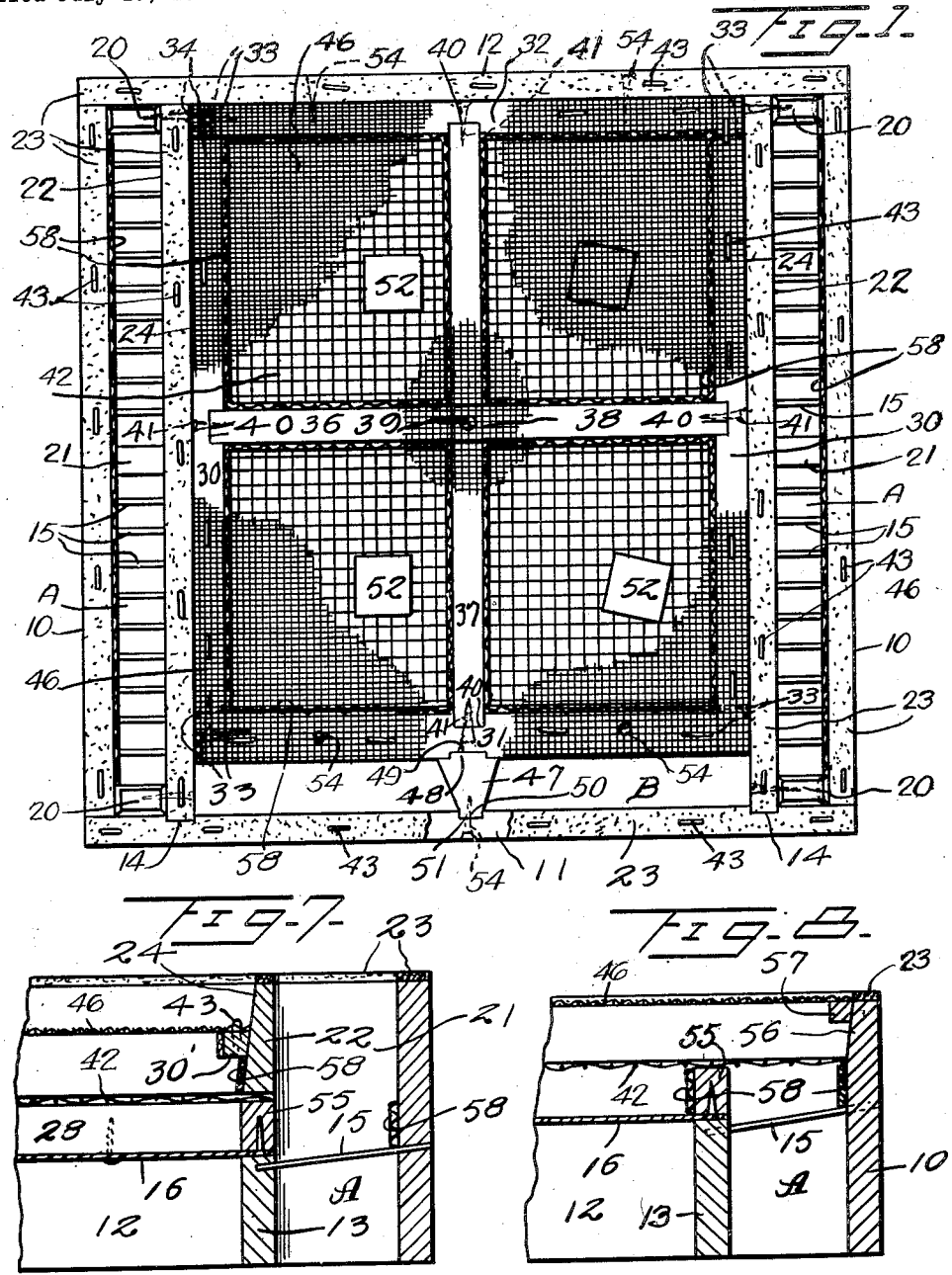

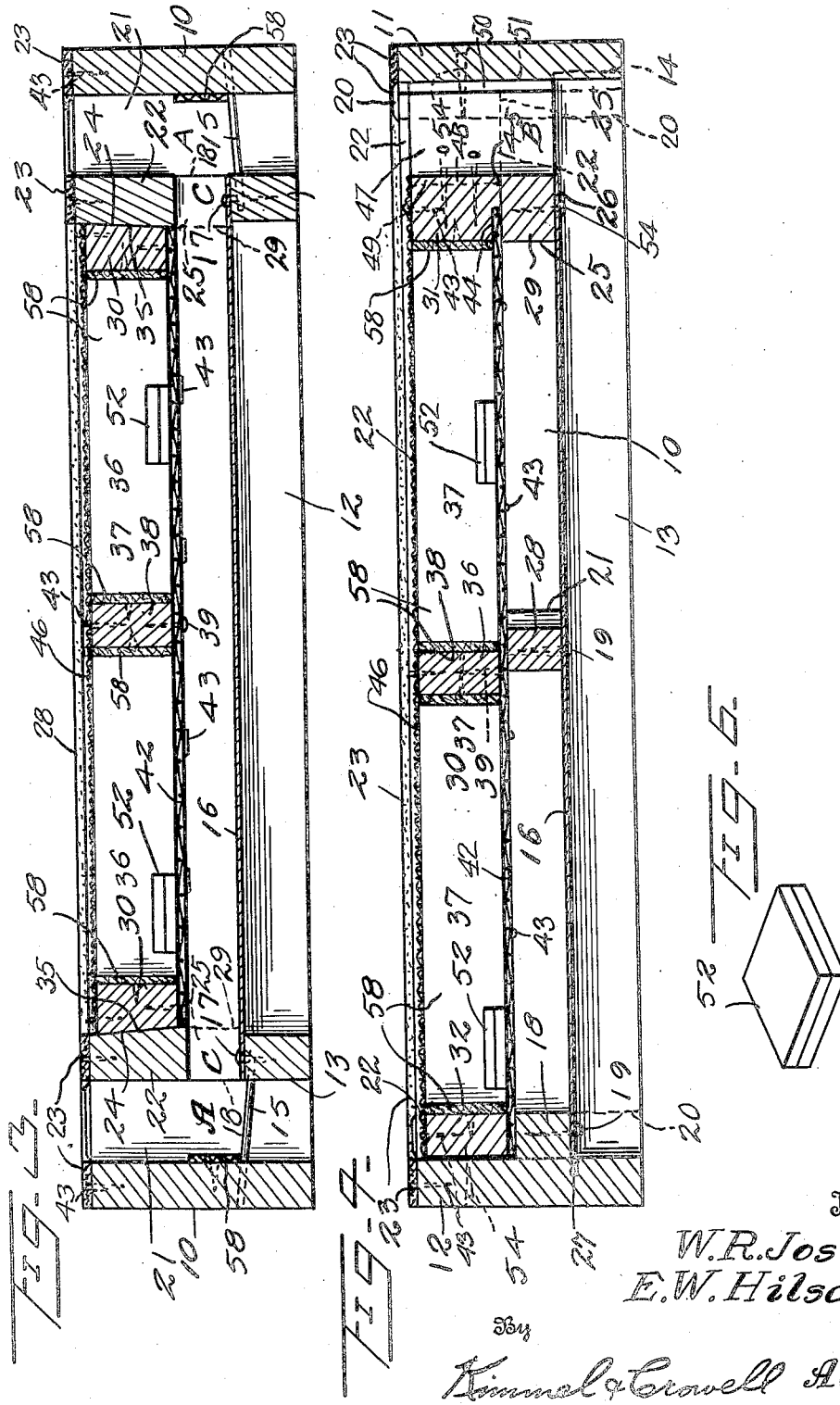

Patented Nov. 27, 1951

2,576,794

UNITED STATES PATENT OFFICE 2,576,794

DEMOUNTABLE TRAY SIEVE

William R. Jost and Edward W. Hilscher, Leavenworth, Kans.

Application July 19, 1948, Serial No. 39,398

5 Claims. (Cl. 209—405)

Our invention relates to a demountable, separable or removable tray sieve for stack sieve bolters or sifters as used in connection with flour bolting machines in flour mills and the invention comprehends a sieve which can be used in several different types of frames, either right or left hand or two way sieve as a full or scalping sieve, which is more simple and, therefore, can be produced with less material, at less cost and thus sold at a lower price, which is lighter in weight and thus cuts down the weight of the sieves and bolting machine thus facilitating giving the latter the proper throw, and is self-sealing and leakproof.

The invention also comprehends a demountable sieve construction for flour bolting machines which eliminates all interfitting sliding connections or tongue and groove joints between the tray or upper frame and the main or lower frame or other parts of the frame structures, thereby eliminating a great deal of machining, to provide a mounting for the tray which prevents the tray from accidentally sliding out of sifting position as well as leakage at all points including between the pan and frame, while providing beveled joints between the tray and main frame to form sealing joints against leakage, simpler frame constructions for the tray and main frame whereby they can be made with considerable saving of time, labor and materials as well as stronger construction and facilitation of repairs or replacement and cost of upkeep, while also making provision for right and left hand or two-way use and discharge at either or both sides when in use in a stack on flour bolting machines.

The invention also comprehends a demountable tray sieve which may be readily made into a lower or scalping sieve or a full or top sieve without open side spaces or channels at the sides of the removable or demountable top frame or tray and the coarse and fine or bolting screens or cloth, there being no need of side channels leading down through the top sieve of a stack.

The foregoing objects and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings,

Figure 1 is a top plan view of a demountable tray sieve embodying my invention;

Figure 2 is a top plan view of the main or lower frame of the sieve with the tray removed;

Figures 3, 4 and 5 are sectional views taken on the lines 3—3, 4—4 and 5—5 respectively of Figure 2;

Figure 6 is a perspective view of a cleaner employed in the tray;

Figure 7 is a fragmentary vertical sectional view showing a slight modification; and Figure 8 is a view similar to Figure 7 in which the tray extends entirely across the main frame to form a full sieve.

Referring to the drawings, the sieve comprises a main or lower rectangular frame of wood or other material composed of parallel outer side walls 10 and end or front and rear bars or walls 11 and 12 butted against and secured by fastenings such as nails or otherwise to the ends of the side walls 10. Inner relatively shallow side bars 13 are spaced inwardly from and parallel to side walls 10 and between end walls 11 and 12 at the lower portions thereof and similarly secured in vertical grooves or mortises 14 in the inner face of wall 11 and against wall 12 to form vertical passages or channels A through which sifted or screened material may pass, and across which inwardly inclined rows of rods or nails 15 are secured. A metal pan or imperforate plate 16 is secured over and to the bars 13 from the top by nails as indicated at 17 and terminates at its front edge in spaced parallel relation to end wall 11 to provide a vertical passage B therebetween and extending to the inside of end wall 12 at the back.

The end or rear wall 12 is provided with a projection or bar 18 at the inside with its ends terminating at the outer faces of the inner side bars 13, and against which pan or plate 16 is similarly secured from the bottom as indicated at 19. Vertical corner blocks 20 and intermediate spacer blocks 21 are disposed at the corners and centrally between the same intermediately of the sides between sides 10 and bars 13 to stiffen same, and corner blocks 20 extend slightly above all outside frame members 10, 11 and 12 and inner top members or bars 22 spaced above and parallel to bars 13 and the side margins of pan 16 between and secured to end walls 11 and 12 and resting on the end portions of projection or bar 18, are similarly secured to blocks 20 and spacers or spacer blocks 21. Frame members 10, 11, 12 and 22 are covered with wool plush strips or the like 23 and when the sieves are stacked on a bolting machine or sifter, the corner blocks by reason of their upward projections form bearings for the sieves and prevent mashing of the plush strips which seal between the sieves to prevent leakage.

Inner top bars or members 22 are sloped upwardly or beveled on the inside as indicated at 24 to form a self-sealing joint with the demountable sieve when inserted in position as will be later described. Horizontal spacing blocks 25 are disposed in alignment with and between bars 13 and 22 against wall or bar 11 and over the front corners of pan or plate 16 which latter corners are disposed between bars 13 and blocks 25 as in horizontal kerfs or saw cuts in the bottom of the latter as indicated at 26. The rear edge of pan or plate 16 is disposed in a horizontal kerf or saw cut 27 in end wall 12 beneath projection or bar 18. Intermediate and front transverse bars 28 and 29 are disposed between and abut spacer blocks 21 and 25 respectively, on pan or plate 16 and the plate is similarly secured thereto at 19. The ends of bar 28 extend between bars 13 and 22 and bar 29 is disposed at the front marginal edge of pan or plate 16 at passage B to prevent escape of the sifted material at this point and so that such escape can only take place at the sides at passages C between inner bars 13 and 22 to vertical passages A and between rods 15 to the sieve therebeneath in the stack.

The tray forming the demountable or removable portion of each sieve comprises an upper rectangular frame fitting between inner side bars 22 and end bars 11 and 12. This frame includes side bars 30 and front and rear end bars 31 and 32 suitably connected at their ends and corners of the upper frame as by mortise and tenon joints 33 and may be nailed together from both sides as at 34 or otherwise connected. Bars 30 are beveled on the outside to taper downwardly as at 35 to form a self-sealing joint with the beveled inner faces 24 of inner side bars 22, and are connected and braced by an intermediate cross bar or brace 36. A central longitudinal bar or brace 37 connects and braces end bars 31 and 32 and crosses transverse brace 36 at right angles where they are mortised together at 38 and connected as by a nail or screw 39. The ends of braces 36 and 37 are mortised into grooves 40 vertically in the inner faces of bars 30, 31 and 32 and connected as by nails 41 from the outside. A coarse screen 42 is secured to the bottom of the demountable tray frame as by staples 43, and the front end bar 31 is recessed at the inner side of the bottom thereof as at 44 to provide a seat and shoulder or front stop for the front edge of screen 42 and a bottom projection 45 at the front to engage on bar 29 to prevent escape of shifted material at this point. A fine wire or cloth screen 46 is secured to the top of the tray frame as by similar staples 43 as are strips 23.

The tray is adapted to rest on projection or bar 18 at the rear end bar 32, and on cross bars 28 and 29 with the front end bar 31 on cross bar 29 in alignment at their front sides at passage B and sides 30 wedging or fitting tight against bars 22. A wedge or keystone shaped block 47 is secured at the upper portion of its inner side to bar 31 and may have a mortise and tenon joint connection therewith by a reduced projection or tongue 48 entering a central vertical mortise or groove 49 in the front or outer face of bar 31 and a reduced front tenon 50 entering a vertical mortise or groove 51 in the inner side of bar 11 at the center thereof, acting as a guide for the tray when inserted into position and also form a stiffener for bar 31 in the channel or passage B.

Blocks 25 prevent bars 22 from being pushed down by the weight and pressure of the sieves above it. Cleaners 52 are provided in the tray compartments formed by braces 36 and 37 that connect with the outer frame thereof and are unrestrainedly disposed on the coarse screen or wire mesh 42 to move about in a jumping motion to keep the bolting cloth 46 and fine mesh screen 42 clean. One or more cleaners 53 are provided on pan or plate 16 and the rows of nails or rods 15 prevent the cleaners from falling through the passages or channels A on top of the bolting cloth or fine wire screen 46 of the sieve therebeneath and possibly causing damage. Screws 54 demountably or removably secure the tray or upper screen frame in position on and in the main or lower frame at the back or end 12 through plate or pan 16 and bars 29 and 31 at the bottom and end wall 11 and block 47 at the front or otherwise, so that the tray or sieve is firmly held in operative position. By removing these screws, the tray can be lifted from the main frame in a minute or so and replaced with a new or repaired tray and the machine put back in operation. A broken or damaged tray or sieve can be repaired and made available for any future use, and by removing or demounting the trays the parts within the main frame and tray are readily accessible for repair. By doing away with all interfitting parts such as tongue and groove connections between the tray and main frame, much machining, time, labor and expense in production are saved in manufacturing the sieves while still maintaining and producing an efficient and serviceable sieve for right or left hand use and a break sieve without any changes in the tray construction.

Also, by making the demountable tray or upper frame shallow with the side bars 30' of less thickness or height than the inner sides or bars 22 and mounting the bolting cloth or fine screen 46 thereon by the fasteners 43, the shallow frame may fit down within the beveled surfaces 24. In this instance, the coarse screen 42 is secured beneath the bars 22 and over the bars 18, 28 and 29 with a bar 55 between the coarse screen and the pan or plate 16 at one side to close the escape into the passage or channel A in that side, leaving the opposite or only one side open in the passageways C.

In Figure 8 of the drawings, the upper bars 22 are omitted and the inner faces of the sides 10 are beveled as at 56 corresponding to the bevels 24 for engagement by the side bars 57 of the tray or screen frame carrying the fine mesh screen 46 below the top edge of the main frame so as to provide a full sieve. It should be noted that the bars 30' in Figure 7 and 57 in Figure 8 are beveled in a manner corresponding to the bevel of the bars 30 forming the sides of the tray in Figures 1 to 4 inclusive, to give a tight self-sealing joint. The type of sieve shown in Figure 8 is used as the top sieve in a bolting machine as there is no need for side channels or passages A in the top sieve. The enlargement of the tray is only in width or at the sides, the tray fitting at the back in the usual manner and terminating in spaced relation to the front end to provide the same mounting for the tray and the passage B as heretofore described. However, in this construction no unnecessary machine operations are required and the tongue and groove joints or tracks at the sides of the tray and main frame to slidably mount the tray in position are eliminated. Linings 58 of balata or woven balata belt duck strips are provided inside the side walls 10 in line with openings or passages C between bars 13 and 22 and around the insides of the tray compartments formed within the tray or upper frame bars 30, 31 and 32 by the crossed bars 37 and 38, to protect these parts from wear at such points from the cleaners 52 and 53 but allowing escape of the sifted material or flour.

What is claimed is:

1. In a sieve for bolters, a rectangular shallow framelike body portion having inner walls spaced from the sides and one end of the frame and providing a chamber within said walls of less area than said body portion, and inner walls having upwardly divergent surface areas, an imperforate bottom for said chamber having openings communicating with the spaces at opposite sides thereof, the space at the end being closed off, and a demountable rectangular frame of less height than said body portion supported in spaced relation to said imperforate bottom and having beveled sides adapted to wedgingly engage between said divergent surfaces of the inner sides of said inner walls, corner blocks between the sides and inner walls of the body portion and projecting above the latter, cushion strips along the top edges of the body portion, said demountable frame terminating in spaced relation to one end of the body portion and a block carried by said frame to extend across said latter space and slidably engage in a groove formed in said one end of said body portion whereby said frame is insertable and removable from the top.

2. In a sieve for bolting machines, a rectangular framelike outer body having outer walls and an open top, a pair of parallel walls connecting a pair of said outer walls and spaced inwardly from an opposite pair of said outer walls defining an inner chamber of less area than said body, said parallel walls having upwardly sloped inner surfaces, a bottom for said chamber open at at least one side to form a passage spaced inwardly of said outer walls, a demountable rectangular frame of less height than said outer body forming a tray fitting within said chamber, said tray having opposite side members formed with inwardly sloped surfaces engageable with and coacting with said upwardly sloped inner surfaces to effect wedging of the tray between said parallel walls, sifting means carried by said tray, and sealing means formed of compressible strips disposed along the top surfaces of said outer body and said inner chamber.

3. A sieve construction as defined by claim 2 having vertically extending spacing members disposed between said outer body and said inner chamber with a top surface slightly elevated above the plane thereof to prevent crushing of said sealing means.

4. In a sieve for bolters, a rectangular shallow frame-like outer body portion having inner walls spaced from a pair of opposite sides of said body providing a chamber within said walls of less area than said body portion, passage means disposed at the opposite sides of said chamber opening upwardly and downwardly of the body portion, an imperforate bottom for said chamber having openings communicating with said passages, upwardly sloped side wall portions disposed above the plane of said imperforate bottom, a demountable rectangular frame of less height than said body portion having wedge-like side walls engageable with said upwardly sloped portions to wedgingly support said frame in spaced relation above said imperforate bottom, means detachably securing said frame in position, a perforate sieving means carried by said frame, spacing members disposed between said body portion and said chamber as vertical corner blocks, and compressible strips secured to the top surfaces of said body portion and said frame whereby said compressible strips provide means for sealing the space between superposed sieves and said spacing members prevent crushing thereof.

5. In a sieve for bolting machines, a rectangular frame having side and end walls, upper inner side bars spaced from said side walls and of shallower depth than the side walls having opposed beveled inner faces, cross bars between said inner side bars and supporting the latter, one of said cross bars being spaced from an adjacent end wall, an imperforate bottom under said cross bars, inner lower bars beneath said bottom and said inner bars and extending between the end walls, blocks between the inner bars and the side walls and extending thereabove, rows of rods extending between the lower bars and the side walls, the space between the upper inner bars and the bottom communicating with the spaces between the side walls and inner bars, a screen frame having beveled sides cooperating with the opposed beveled inner faces of said side walls to wedgingly fit said cross bars, said screen frame having a fine mesh upper screen and a coarse mesh lower screen and interior compartments, one end of the screen frame terminating in spaced relation to one end of the first frame, braces between the sides and ends of the screen frame forming said compartments, cleaners in said compartments, a wedge shaped block secured to one end of the screen frame at the end provided with a space in the first frame and projecting below the screen frame, said block slidably engaging a vertical groove in the inner face of the adjacent end of the first frame, compressible strips secured to the top edges of said screen frame and said side and end walls.

WILLIAM R. JOST.
EDWARD W. HILSCHER.

REFERENCES CITED

The following references are of record in the file of this patent:

UNITED STATES PATENTS

| Number | Name | Date |
|---|---|---|
| 157,220 | Porter | Nov. 24, 1874 |
| 232,507 | Huntley et al. | Sept. 21, 1880 |
| 559,164 | Carpenter | Apr. 28, 1896 |
| 696,831 | Marmon | Apr. 1, 1902 |
| 1,246,346 | Stephens | Nov. 13, 1917 |
| 1,264,416 | Maney | Apr. 30, 1918 |
| 2,068,413 | Hunsicker | Jan. 19, 1937 |
| 2,181,605 | Norvell | Nov. 28, 1939 |
| 2,397,807 | Rick | Apr. 2, 1946 |